(12) United States Patent
Arnold et al.

(10) Patent No.: US 9,103,453 B2
(45) Date of Patent: Aug. 11, 2015

(54) VALVE SHAFT APPARATUS FOR USE WITH ROTARY VALVES

(71) Applicant: FISHER CONTROLS INTERNATIONAL, LLC, Marshalltown, IA (US)

(72) Inventors: David Anthony Arnold, Marshalltown, IA (US); David George Halm, Haverhill, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 9 days.

(21) Appl. No.: 14/158,588

(22) Filed: Jan. 17, 2014

(65) Prior Publication Data

US 2014/0131608 A1    May 15, 2014

Related U.S. Application Data

(62) Division of application No. 12/766,556, filed on Apr. 23, 2010, now Pat. No. 8,662,099.

(51) Int. Cl.
*F16K 1/22* (2006.01)
*F16K 1/226* (2006.01)
*F16K 41/04* (2006.01)

(52) U.S. Cl.
CPC .............. *F16K 1/2268* (2013.01); *F16K 41/046* (2013.01)

(58) Field of Classification Search
CPC .............................. F16K 1/2268; F16K 41/046
USPC ............... 251/214, 305–308; 137/15.11, 312; 277/320, 929, 512–517
See application file for complete search history.

(56) References Cited

U.S. PATENT DOCUMENTS 3,307,574 A    3/1967  Anderson
3,770,247 A    11/1973 Nelson
(Continued)

FOREIGN PATENT DOCUMENTS

DE    2229978    1/1974
DE    2901207    7/1980
(Continued)

OTHER PUBLICATIONS

Tyco Flow Control, "Butterfly Valves-Figure 990," installation, operating, repair and maintenance instructions, May 2001, 2 pages.
(Continued)

*Primary Examiner* — John Bastianelli
(74) *Attorney, Agent, or Firm* — Hanley, Flight & Zimmerman, LLC

(57) ABSTRACT

A valve shaft apparatus with a rotary valve includes a shaft having a first portion in an opening of a valve body and a second portion in a cavity of a closure member. A first seal is coupled to the first portion to prevent fluid leakage into the opening of the valve body, where the first seal defines a first leakage detection area. A second seal is coupled to the second portion to prevent fluid leakage into the cavity, the second seal is to define a second leakage detection area. A passageway in the shaft is fluidly coupled to the first and second leakage detection areas to provide an indication of fluid leakage past the first seal in the opening or to detect fluid leakage past the second seal in the cavity. The passageway is in fluid communication with a shaft outlet formed in an end of the shaft.

21 Claims, 5 Drawing Sheets

(56) References Cited

U.S. PATENT DOCUMENTS

| | | | |
|---|---|---|---|
| 3,779,511 | A | 12/1973 | Wenglar |
| 4,327,765 | A | 5/1982 | Wilson et al. |
| 4,522,223 | A | 6/1985 | Balsys et al. |
| 5,372,352 | A | 12/1994 | Smith et al. |
| 5,406,979 | A * | 4/1995 | McHugh .................. 137/557 |
| 5,445,248 | A | 8/1995 | Clarke et al. |
| 5,832,973 | A | 11/1998 | Goldschmidt et al. |
| 6,167,900 | B1 | 1/2001 | Laird |
| 6,206,034 | B1 | 3/2001 | McHugh |
| 6,655,659 | B2 | 12/2003 | Burke |
| 7,057,722 | B2 | 6/2006 | Gehrlein et al. |
| 8,662,099 | B2 | 3/2014 | Arnold et al. |
| 2008/0202607 | A1 | 8/2008 | Hegberg et al. |
| 2011/0260086 | A1 | 10/2011 | Arnold et al. |

FOREIGN PATENT DOCUMENTS

| | | |
|---|---|---|
| EP | 0348217 | 12/1989 |
| JP | 2004191105 | 7/2004 |

OTHER PUBLICATIONS

Tyco Flow Control, "Keystone Butterfly Valves-Figures 990 and 920," 2009, 4 pages.

Intenational Searching Authority, "International Search Report," issued in connection with International patent application No. PCT/US2011/028517, mailed on Jun. 29, 2011, 4 pages.

Intenational Searching Authority, "Written Opinion of the International Searching Authority," issued in connection with International patent application No. PCT/US2011/028517, mailed on Jun. 29, 2011, 8 pages.

United States Patent and Trademark Office, "Requirement for Restriction/Election," issued in connection with U.S. Appl. No. 12/766,556, mailed on Sep. 21, 2012, 9 pages.

United States Patent and Trademark Office, "Non-Final Office Action", issued in connection with U.S. Appl. No. 12/766,556, mailed on Feb. 6, 2013, 23 pages.

United States Patent and Trademark Office, "Ex Parte Quayle Action," issued in connection with U.S. Appl. No. 12/766,556, mailed on Jul. 16, 2013, 9 pages.

United States Patent and Trademark Office, "Notice of Allowance and Fee(s) Due," issued in connection with U.S. Appl. No. 12/766,556, mailed on Oct. 17, 2013, 19 pages.

Intenational Searching Authority, "International Search Report," issued in connection with International patent application No. PCT/US2015/011683, mailed on Apr. 16, 2015, 5 pages.

Intenational Searching Authority, "Written Opinion of the International Searching Authority," issued in connection with International patent application No. PCT/US2015/011683, mailed on Apr. 16, 2015, 4 pages.

* cited by examiner

VALVE SHAFT APPARATUS FOR USE WITH ROTARY VALVES

CROSS-SECTION TO RELATED APPLICATION

This patent arises as a divisional application of U.S. patent Ser. No. 12/766,556, entitled Valve Shaft Apparatus For Use With Rotary Valves, filed on Apr. 23, 2010, which is incorporated herein by reference in its entirety.

FIELD OF THE DISCLOSURE

This disclosure relates generally to fluid valves and, more particularly, to valve shaft apparatus for use with rotary valves.

BACKGROUND

Valves are commonly used in process control systems to control the flow of process fluids. Rotary valves (e.g., butterfly valves) typically have a closure member (e.g., a disc) disposed in a fluid path. A valve shaft operatively couples the closure member to an actuator that rotates the closure member between an open position and a closed position to allow or restrict fluid flow between an inlet and an outlet of the valve. When the closure member is in the closed position, the closure member sealingly engages a valve seat or sealing surface (e.g., a seal ring fixed to the valve body) to restrict fluid flow through the valve.

A follower shaft (which may be integrally formed with the valve shaft) is typically coupled to an end of the closure member opposite the end of the valve shaft to provide support to the closure member so that the closure member can maintain proper alignment with the sealing surface and provide a tight shut-off when the valve is in the closed position. Without a follower shaft, the closure member may deflect away from the sealing surface when the valve is in the closed position, thereby causing fluid leakage between the inlet and the outlet when the valve is in a closed position. Typically, a mechanical fastener (e.g., a pin, a weld, etc.) is employed to couple the follower shaft to the closure member. The follower shaft rotates with the closure member as the closure member moves between the first and second positions and an end cap retains the follower shaft within the valve body.

However, other than a welded connection, pins and/or other mechanical fasteners do not provide a sanitary connection between the follower shaft and the closure member, which can cause bacterial growth that can contaminate the process fluid. In some applications such as, for example, the food and beverage industry and the pharmaceutical industry, sanitary valves are often employed. Thus, sanitary valves typically include a follower shaft and a valve shaft that are coupled to the closure member via welding. However, welding a follower shaft and/or the valve shaft to the closure member requires the use of a split-body valve in order to enable assembly of the fluid valve. Split-body valves include a body liner or body seal to provide a seal and, thus, increase manufacturing complexity and costs.

SUMMARY

A valve shaft apparatus for use with a rotary fluid valve disclosed herein includes a shaft having a first portion to be positioned in an opening of a valve body and a second portion to be positioned in a cavity of a closure member. A first seal is coupled to the first portion of the shaft to prevent fluid leakage into the opening of the valve body, where the first seal defines a first leakage detection area adjacent the first seal. A second seal is coupled to the second portion to prevent fluid leakage into the cavity of the closure member, where the first seal is spaced from the second seal and the second seal is to define a second leakage detection area adjacent the second seal. A passageway is formed in the shaft and fluidly coupled to the first and second leakage detection areas to provide an indication of fluid leakage past the first seal in the opening or to detect fluid leakage past the second seal in the cavity. The passageway is in fluid communication with a shaft outlet formed in an end of the shaft, where the shaft outlet is positioned away from the first and second leakage detection areas.

In another example, a valve shaft apparatus disclosed herein includes a shaft having a first portion to be positioned in an opening of a valve body, a second portion to be positioned in a cavity of the closure member, and a third portion between the first and second portions, where the third portion is at least partially positioned within a fluid flow path of the valve body. A first seal is coupled to the first portion of the shaft and is to prevent fluid leakage into the opening of the valve body and a second seal is coupled to the second portion to prevent fluid leakage into the cavity of the closure member. A first passageway is formed in the shaft and is fluidly coupled to a first port formed in an end of the shaft. The first passageway is to fluidly couple the first port and the fluid flow path of the valve body via the third portion of the shaft. The first passageway provides a sampling port to sample process fluid flowing through the fluid flow path or an injection port to enable injection of a fluid in the fluid flow path.

In yet in another example, a valve shaft apparatus disclosed herein includes means for supporting a closure member of a fluid valve, where the means for supporting the closure member is removably coupled to a body of the fluid valve via an opening extending to an outer surface of the body. The apparatus includes first means for providing a seal between a fluid flow path of the fluid valve and the opening of the body through and first means for fluidly coupling a first area adjacent the first means for providing a seal and an aperture formed in the means for supporting the closure member, where the aperture is adjacent the outer surface of the body. The first means for fluidly coupling to provide an indication of fluid leakage past the first means for sealing. The apparatus includes second means for providing a seal between the fluid flow path of the fluid valve and a cavity of the closure member, where the first means for providing the seal and the second means for providing the seal is disposed on the means for supporting the closure member. The apparatus also includes second means for fluidly coupling a second area adjacent the second means for providing a seal and the cavity to the aperture of the first means for supporting the closure member, the second means for fluidly coupling to provide an indication of fluid leakage past the second means for providing the seal.

DETAILED DESCRIPTION

The example valve shaft apparatus described herein may be generally applied for use with rotary fluid valves of any size, type, and/or geometry to provide support to a closure member (e.g., a disc) of a rotary fluid valve. The example valve shaft apparatus described herein are particularly advantageous for use in sanitary applications because the valve shaft apparatus significantly reduces the likelihood of bacterial growth and, thus, contamination of a process fluid. Additionally, the example valve shaft apparatus includes a seal leakage indicator or detector (e.g., a visual indicator) to provide an indication of process fluid leakage past a seal of the valve shaft apparatus. Detecting fluid leakage in sanitary applications relatively quickly significantly reduces the likelihood of bacterial growth and, thus, contamination of the process fluid. Thus, the seal leakage indicator described herein is advantageous for use in sanitary applications because seal failure may cause contamination of the process fluid if not detected relatively quickly. Additionally or alternatively, the example valve shaft apparatus described herein may include a sampling port and/or an injection port integrally formed with a shaft of the valve shaft apparatus. The example sampling and/or injection port may be used to inject fluid (e.g., a chemical) into the fluid flow path of the fluid valve or may be used to sample fluid flowing within the fluid valve while the fluid valve is in-line.

Figure 1:
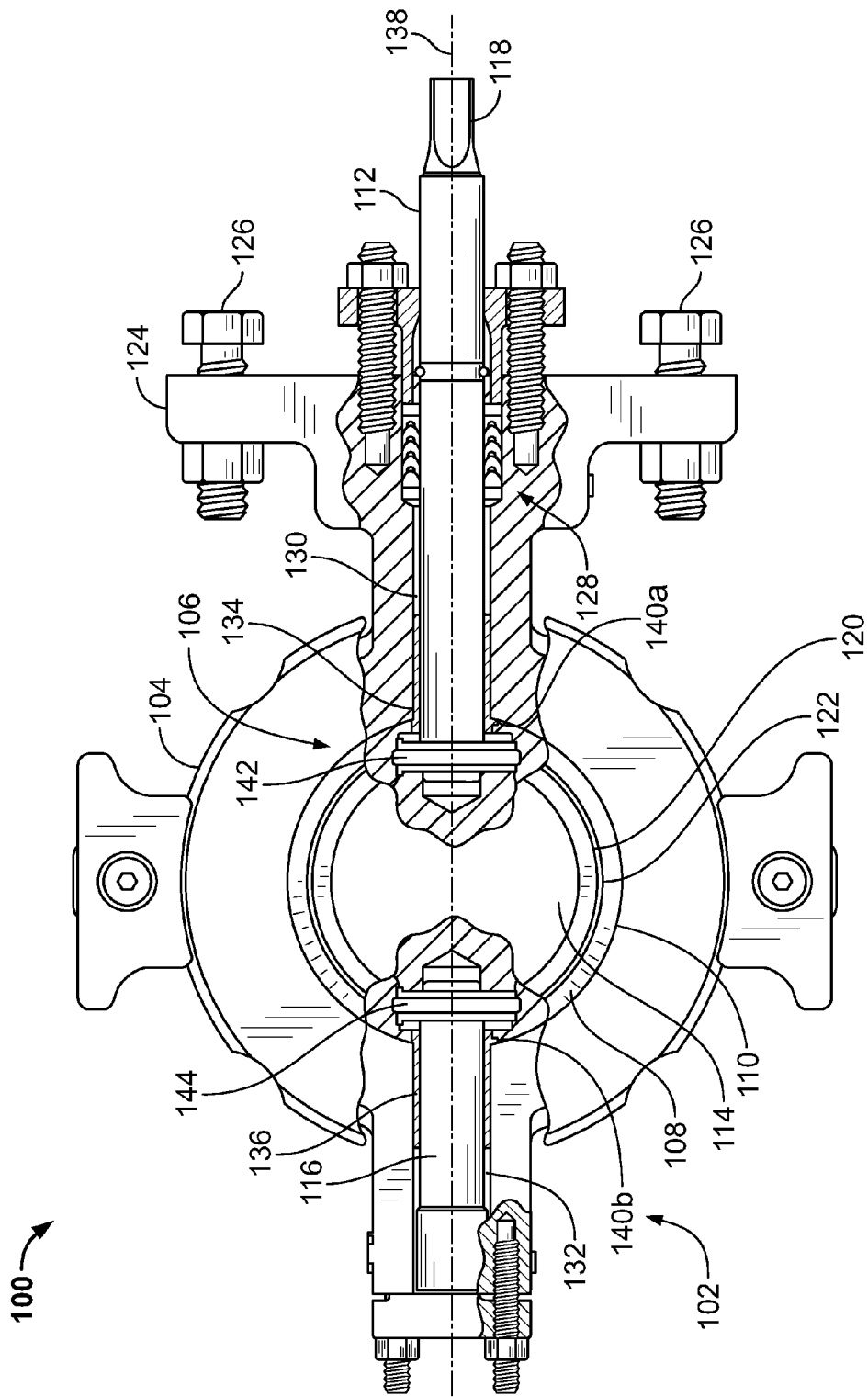
FIG. 1 illustrates a known example fluid valve having a valve trim assembly coupled via mechanical fasteners.

Before describing the example valve shaft apparatus, a brief discussion of a known fluid valve 100 having a known valve shaft apparatus 102 is provided in connection with FIG. 1. Referring to FIG. 1, the valve 100 includes a valve body 104 that houses a valve trim 106. The valve body 104 is generally cylindrical and has a central opening 108 that defines a fluid flow passageway between an inlet 110 and an outlet (opposite the inlet 110 but not shown). As shown, the valve trim 106 includes a valve shaft 112, a closure member 114 (e.g., a disc), and a follower shaft 116. In some examples, the valve shaft 112 and the follower shaft 116 may be of unitary or single piece construction. A second end 118 (e.g., a splined end, a square end, etc.) of the valve shaft 112 operatively couples the closure member 114 to an actuator (not shown).

The closure member 114 is disposed within the fluid flow passageway and has a peripheral edge 120 that sealingly engages a valve seat or annular sealing surface 122 (e.g., a seal ring) disposed in the central opening 108 to prevent fluid flow through the valve 100 when the valve 100 is in a closed position. A flange 124 is integrally formed with the valve body 104 and couples the valve body 104 to an actuator (not shown) via fasteners. The flange 124 also houses a packing system 128 to prevent leakage of process fluid to the environment.

The valve body 104 also has a first opening 130 and a second opening 132 that are generally coaxially aligned and adapted to receive the valve shaft 112 and the follower shaft 116, respectively. Bearings 134 and 136 are disposed in the respective openings 130 and 132 between the valve body 104 and the valve shaft 112 and the follower shaft 116, respectively. The bearings 134 and 136 align the closure member 114 along an axis 138 and bearing flanges 140a and 140b align (i.e., center) the closure member 114 relative to the central opening 108 and the valve body 104. The bearings 134 and 136 also aid the shafts 112 and 116 in alignment and rotation and reduce friction between the respective shafts 112 and 116 and the valve body 104.

In operation, an actuator applies or exerts a torque to the valve shaft 112 (e.g., via a lever) to drive (e.g., rotate) the closure member 114 between an open position to allow fluid flow through the valve 100 and a closed position to restrict or prevent fluid flow through the valve 100. The follower shaft 116 rotates with the closure member 114 as the closure member 114 moves between the open and closed positions. When the closure member 114 is in the closed position, the follower shaft 116 provides support to the closure member 114 and prevents the closure member 114 from moving or deflecting away from the sealing surface 122. Thus, without the follower shaft 116, the closure member 114 may deflect and not sealingly engage the annular sealing surface 122, thereby causing leakage of process fluid across the closure member 114 between the inlet 108 and the outlet.

In this example, the valve shaft 112 and the follower shaft 116 are coupled to the closure member 114 via pins 142 and 144, respectively. However, pin connections (or other fasteners) are typically not suitable for use in sanitary applications because such connections are prone to bacterial growth, which can contaminate the process fluid. In sanitary applications, welded connections are often employed because welded connections are not prone to bacterial growth and, thus, provide sanitary connections. As a result, in such applications, the follower shaft 116 and/or the valve shaft 112 are typically welded to the closure member 114.

However, welded connections between the follower shaft 116 and/or the closure member 114 require the use of a split valve body. The valve shaft 112 and the follower shaft 116 are welded to the closure member 114 and the assembly is disposed within a valve body via an opening or slotted area of the valve body. A body seal or liner is disposed within the split valve body to provide a seal to prevent ingress of contaminate into the valve body and/or prevent egress or leakage of fluid to the environment through the opening or slotted area of the split valve body. Split body valves increase manufacturing complexity and costs. Further, welding the follower shaft 116 to the closure member 114 may limit accessibility to the follower shaft 116 during maintenance or repair. Typically, the valve 100 must be taken off-line (e.g., the valve trim 106 must be removed from the valve body) during maintenance of the follower shaft 116.

Figure 2A:
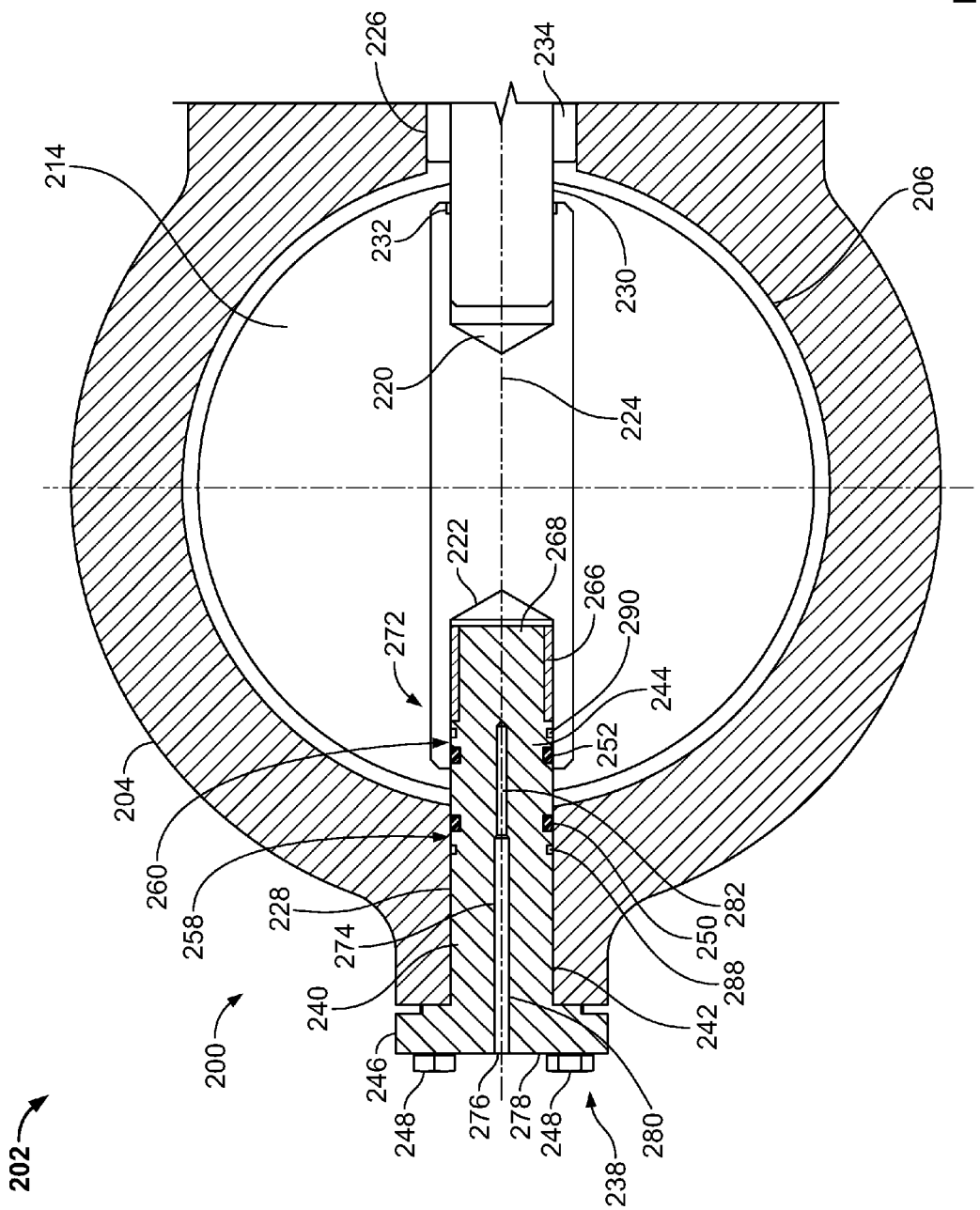
FIG. 2A is a cross-sectional view of a portion of a fluid valve implemented with an example valve shaft apparatus described herein.
Figure 2B:
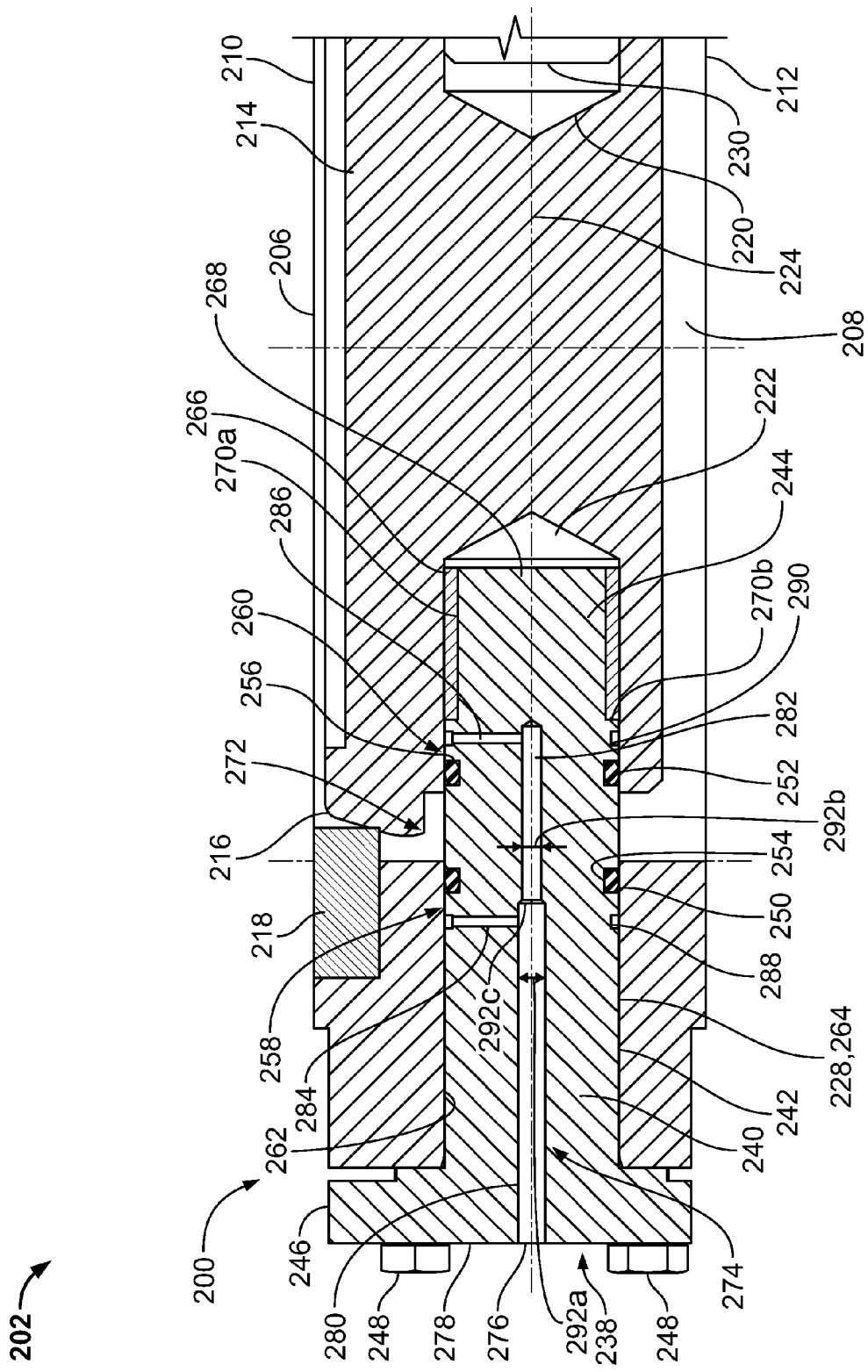
FIG. 2B illustrates another cross-sectional view of the example valve shaft apparatus of FIG. 2A.

FIG. 2A illustrates an example valve shaft apparatus 200 described herein coupled to a rotary fluid valve 202. FIG. 2B illustrates another cross-sectional view of the example valve shaft apparatus 200. The example valve shaft apparatus 200 may be used to implement rotary valves such as, for example, the rotary valve 100 of FIG. 1 and/or any other suitable fluid valves or fluid flow control devices. In particular, the valve shaft apparatus 200 may be used in sanitary applications because the valve shaft apparatus 200 provides detection or indication (e.g., visual detection) of seal failure or fluid leakage. In sanitary applications, failure to detect seal failure or fluid leakage in fluid valves may significantly increase the likelihood of bacterial growth, which can cause contamination of the process fluid.

Referring to FIGS. 2A and 2B, the fluid valve 202 includes a valve body 204 having a central opening 206 that defines a fluid flow path 208 between an inlet 210 and an outlet 212. A closure member 214 (e.g., a disc) is disposed within the fluid flow path 208 to control fluid flow between the inlet 210 and the outlet 212. The closure member 214 includes a peripheral edge 216 that sealingly engages a valve seat or annular sealing surface 218 (e.g., a seal ring) disposed in the central opening 206 to prevent fluid flow through the fluid valve 202 when the fluid valve 202 is in a closed position. Additionally, the closure member 214 includes a first bore or cavity 220 aligned with and a second bore or cavity 222 about an axis 224. In the illustrated example, the closure member 214 is depicted as a disc. However, in other examples, the closure member 214 can be any suitable closure member 214 such as, for example, a ball valve and/or any other suitable flow control members.

The valve body 204 includes a drive end opening 226 and a support end or outboard opening 228 opposite the drive end opening 226. In this example, the drive end opening 226 and the outboard opening 228 are generally coaxially aligned with the respective first and second cavities 220 and 222 of the closure member 214 when the closure member 214 is coupled to the valve body 204. The drive end opening 226 of the valve body 204 receives a drive shaft 230 and the outboard opening 228 of the valve body 204 receives the valve shaft apparatus 200.

The drive shaft 230 is disposed within the first cavity 220 of the closure member 214 and is coupled to the closure member 214 via a weld 232. Thus, the drive shaft 230 and the closure member 214 provide a welded connection (e.g., a sanitary connection). A bearing or seal member 234 may be disposed in the drive end opening 226 between the valve body 204 and the drive shaft 230 to reduce friction between the drive shaft 230 and the valve body 204 and/or facilitate rotation of the drive shaft 230 relative to the drive end opening 226. Additionally, seals and/or a packing system may be provided to prevent leakage of fluid to the environment along the drive shaft 230 and/or through the drive end opening 226. An actuator (e.g., a pneumatic actuator, an electric actuator, a hydraulic actuator, etc.) may be operatively coupled to the closure member 214 via the drive shaft 230 to move the closure member 214 relative to the sealing surface 218 to control fluid flow between the inlet 210 and the outlet 212.

As shown, the valve shaft apparatus 200 is disposed within the outboard opening 228 of the valve body 204 opposite the drive shaft 230 or an outboard side 238 of the valve body 204. In this example, the valve shaft apparatus 200 includes a shaft or body 240 having a first portion 242 and a second portion 244. When coupled to the valve body 204, the first portion 242 is disposed within the opening 228 of the valve body 204 and the second portion 244 is disposed within the cavity 222 of the closure member 214. The first portion 242 of the shaft 240 is dimensioned or sized to have a close tolerance fit relative to the opening 228 so that the opening 228 guides and/or aligns the valve shaft apparatus 200 relative to the closure member 214 and the valve body 204. Also, the second portion 244 of the shaft 240 is dimensioned or sized to have a close tolerance fit relative to the cavity 222 of the closure member 214 so that the closure member 214 can rotate about the shaft 240. Thus, in the illustrated example, a mechanical fastener is not required to couple the shaft 240 and the closure member 214. The shaft 240 also includes a flange or flanged portion 246 to couple the shaft 240 to the valve body 204. In this example, the flange 246 is integrally formed with the shaft 240 as a unitary structure and the flange receives fasteners 248 to removably couple the shaft 240 to the valve body 204. Although not shown, in another example, the shaft 240 may include a threaded base portion that threadably couples to the opening 228 (e.g., a threaded opening) of the valve body 204 and/or may be coupled to the valve body 204 via any other suitable fastening mechanism(s).

The shaft 240 includes a first or stationary seal 250 (e.g., an O-ring, a lip seal, etc.) and a second or dynamic seal 252 (e.g., an O-ring, a lip seal, etc.) spaced away from the stationary seal 250. The stationary seal 250 is at least partially disposed in a groove 254 on the first portion 242 of the shaft 240 and the dynamic seal 252 is at least partially disposed in a groove 256 on the second portion 244 of the shaft 240. The stationary seal 250 is disposed in the opening 228 of the valve body 204 to prevent fluid leakage into the opening 228 of the valve body 204. The dynamic seal 252 is disposed in the cavity 222 of the closure member 214 to prevent fluid leakage into the cavity 222 of the closure member 214. In one example, when the fluid valve 202 is used for non-sanitary applications, the dynamic seal 252 is not required and may be removed from the shaft 240.

When the shaft 240 is coupled to the valve body 204, the stationary seal 250 defines a first leakage detection area 258 adjacent the stationary seal 250, and the dynamic seal 252 defines a second leakage detection area 260 adjacent the dynamic seal 252. The first leakage detection area 258 can be defined between an outer surface 262 of the shaft 240 and an inner surface 264 of the opening 228 adjacent the stationary seal 250 and the second leakage detection area 260 may be defined as a portion of the cavity 222 of the closure member 214 adjacent the dynamic seal 252. A bearing 266 is disposed adjacent an end 268 the shaft 240 within the cavity 222 to reduce friction and facilitate rotation of the closure member 214 about the shaft 240. The end 268 of the second portion 244 of the shaft 240 may include a recess or reduced diameter portion 270a and stepped or flanged portion 270b to receive the bearing 266.

In this example, the valve shaft apparatus 200 also includes a seal leakage detector or indicator 272 (e.g., a visual indicator). The seal leakage detector 272 is integrally formed with the shaft 240 and provides an indication if the seals 250 and/or 252 fail to provide a sufficient seal (e.g., if the seals 250 and/or 252 have failed). More specifically, the seal leakage detector 272 provides an indication of fluid leakage in the first leakage detection area 258 or opening 228 adjacent the stationary seal 250 and/or fluid leakage within the second leakage detection area 260 or cavity 222 adjacent the dynamic seal 252. As shown, the seal leakage detector 272 is depicted as a weep hole or passageway 274. The passageway 274 fluidly couples the first leakage detection area 258 to the atmosphere and the second leakage detection area 260 to the atmosphere via an opening 276 adjacent an outer surface 278 of the flange 246 or the valve body 204.

As shown, the passageway 274 includes a first passageway 280 in fluid communication with the first leakage detection area 258 and the atmosphere and a second passageway 282 in fluid communication with the second leakage detection area 260 and the atmosphere. The passageway 274 further includes a first channel or path 284 adjacent the stationary seal 250 to fluidly couple the first leakage detection area 258 and the first passageway 280 and a second channel or path 286 adjacent the dynamic seal 252 to fluidly couple the second leakage detection area 260 and the second passageway 282. In this example, the first and second channels 284 and 286 are bores or apertures having diameters of approximately 1 millimeter. However, in other examples, the first and second channels 284 and/or 286 can have any suitable shape, cross-sectional profile and/or dimensions.

Additionally, in this example, the shaft 240 includes a first annular groove or channel 288 and a second annular channel or groove 290. The first annular groove 288 is disposed along the first portion 242 of the shaft 240 adjacent the stationary seal 250 and is fluidly coupled to the first channel 284 to direct, guide or funnel fluid that may leak past the stationary seal 250 toward the first channel 284. Likewise, the second annular groove 290 is disposed along the second portion 244 of the shaft 240 adjacent the dynamic seal 252 and is fluidly coupled to the second channel 286 to direct, guide or funnel fluid that may leak past the dynamic seal 252 toward the second channel 286. The first and second grooves 288 and 290 facilitate or increase fluid flow toward the respective first and second channels 284 and 286 and/or to the passageways 280 and 282. Such a configuration significantly increases fluid leakage detection sensitivity, which is advantageous in sanitary applications because a delay in detecting seal leakage can cause bacterial growth and contaminate the process fluid.

In this example, the first passageway 280 is coaxially aligned with the second passageway 282. Also, the first and second passageways 280 and 282 are coaxially aligned with the axis 224. Generally, the passageway 274 includes a profile (e.g., a cross-sectional profile) that changes between the first and second leakage detection areas 258 and 260 to provide a pressure differential between the first and second passageways 280 and 282 such that any fluid in the passageway 274 flows toward the opening 276 to prevent fluid from flowing from one of the leakage detection areas 258 and 260 into the body 204 of the fluid valve 202 or cavity 222. For example, the passageway 274 may increase in cross-sectional area along portions or sections of the shaft 240 between the first and second leakage detection areas 258 and 260. In the illustrated example, the first passageway 280 has a first cross-sectional area 292a and the second passageway 282 has a second cross-sectional area 292b different than the first cross-sectional area 292a. In this example, the passageways 280 and 282 are cylindrically shaped and the first cross-sectional area 292a has a first diameter that is greater than a second diameter of the second cross-sectional area 292b. For example, the first diameter may be approximately 4 millimeters and the second diameter may be approximately 2 millimeters. Thus, as shown, the first passageway 280 is adjacent the second passageway 282 to provide a stepped profile 292c between the first and second passageways 280 and 282.

As described in greater detail below, because the profile or cross-sectional area of the passageway 274 increases or is larger toward the opening 276 or atmospheric side of the valve body 204, fluid within the first passageway 280 and/or the second passageway 282 flows toward the atmosphere or the opening 276 instead of flowing toward the first and/or second leakage detection areas 258 and 260. Stated differently, the fluid in the passageway 274 does not pressure load within the leakage detection areas 250 and 252 behind the stationary seal 250 and/or the dynamic seal 252 that provide a tight seal. Thus, the passageway 274 prevents fluid in the passageway 274 from flowing between the first leakage detection area 258 and the second leakage detection area 260.

In other examples, the profile or cross-sectional area of the passageway 274 may continually or gradually increase in size between the first and second leakage detection areas 258 and 260. Alternatively, although not shown, the valve shaft apparatus 200 may include a first seal leakage detector associated with detecting leakage within the first leakage detection area 258 that is independent or adjacent a second seal leakage detector associated with detecting leakage within the second leakage detection area 260. The first seal leakage detector may include a first primary passageway to fluidly couple the first leakage detection area 258 to the atmosphere and the second seal leakage detector may include a second primary passageway to fluidly couple the second leakage detection area 260 to the atmosphere such that the first path is not in fluid communication with the second path. In other words, in this example, the first and second seal leakage detectors are not fluidly coupled to the atmosphere via a common fluid passage.

In operation, an actuator operatively coupled to the closure member 214 via the drive shaft 230 moves the closure member 214 between a first or open position to allow fluid flow through the fluid flow path 208 and a second position or closed position to prevent or restrict fluid flow through the fluid flow path 208. The drive shaft 230 and the closure member 214 rotate within the valve body 204 and the closure member 214 rotates relative to the shaft 240. When the fluid valve 202 is in a closed position, the peripheral edge 216 of the closure member 214 sealingly engages the valve seat or sealing surface 218 (e.g., a seal ring) disposed in the fluid flow path 208 to effect a seal and prevent fluid flow through the fluid valve 202. When the closure member 214 is in the closed position, the valve shaft apparatus 200 provides support to the closure member 214 and prevents the closure member 214 from deflecting or moving away from the sealing surface 218. In other words, the shaft 240 maintains alignment of the closure member 214 relative to the sealing surface 218.

The stationary seal 250 prevents fluid leakage into the opening 228 of the valve body 204 and the dynamic seal 252 prevents fluid leakage into the cavity 222 of the closure member 214. If the stationary seal 250 and/or dynamic seal 252 fail to provide a sufficient seal, fluid that leaks past the stationary seal 250 and/or the dynamic seal 252 will flow toward the opening 276 of the passageway 274. Fluid in the passageway 274 (e.g., the first and second channels 284 and 286 and/or the first and second passageways 280 and 282) will flow toward the opening 276 because the fluid pressure within the first passageway 280 is less than the fluid pressure within the second passageway 282 due to the first cross-sectional area 292a (i.e., an area of the first passageway 280) being larger than the second cross-sectional area 292b (i.e., an area of the second passageway 282), thereby providing a path of least resistance toward the opening 276. Thus, the passageway 274 is configured to prevent a build-up of fluid pressure within the passageway 274.

More specifically, if the stationary seal 250 fails to provide a sufficient seal, fluid that leaks past the stationary seal 250 flows toward the first leakage detection area 258. The first annular groove 288 facilitates or directs the fluid toward the first channel 284, which channels or directs the fluid toward the first passageway 280 of the passageway 274. Fluid in the first passageway 280 flows toward the opening 276 of the passageway 274 in fluid communication with the atmosphere (e.g., the outboard side 238 of the fluid valve 202). The fluid in the first passageway 280 will not flow toward the second leakage detection area 260 or the cavity 222 (via the second channel 286) because the cross-sectional area 292b of the second passageway 282 is the smaller than the cross-sectional area 292a of the first passageway 280, thus the pressure of any fluid entering or already in the second passageway 282 will be greater than the fluid pressure in the first passageway 280. In other words, because the cross-sectional area of the passageway 274 increases between the first and second passageways 280 and 282, a path of least resistance is provided toward the opening 276 in fluid communication with the atmosphere, thereby causing the flow of any leakage fluid toward the opening 276.

Similarly, if the dynamic seal 252 fails to provide a sufficient seal, process fluid may leak or flow past the dynamic seal 252 into the second leakage detection area 260 or cavity 222. The second annular groove 290 facilitates or directs the fluid toward the second channel 286, which channels or directs the fluid toward the second passageway 282. Fluid in the second passageway 282 flows toward the opening 276 of the passageway 274 in fluid communication with the atmosphere (e.g., the outboard side of the valve) and will not flow toward the first channel 284 or the first leakage detection area 258 (via the first channel 284) because each of the second passageway 282 and the first channel 284 has a cross-sectional area (e.g., a diameter) that is smaller or less than the cross-sectional area (e.g., a diameter) of the first passageway 280 as described above. The opening 276 of the passageway 274 provides an indication (e.g., a visual indication) that the seals 250 and/or 252 are not properly functioning when process fluid leaks to the atmosphere via the passageway 274 and out of the opening 276. Such seal leakage indication is particularly advantageous in sanitary applications because prolonged delay in detecting fluid leakage caused by seal failure can cause the process fluid to become contaminated.

If either one of the stationary and/or dynamic seals 250 and 252 fails to provide a sufficient seal, the valve shaft apparatus 200 can be removed from the valve body 204. Upon inspection and detection of fluid leakage via the opening 276, the valve may 202 be shut-down and the valve shaft apparatus 200 may be serviced. Because the valve shaft apparatus 200 can be assembled prior to assembling it to the fluid valve 202, the valve shaft apparatus 200 can be serviced while the valve body 204 is in-line. For example, the shaft 240 may be removed from the valve body 204 via the fasteners 248. The shaft 240, the seals 250 and 252, and/or the bearing 266 may be removed from the valve body 204 and/or repaired or replaced. After the stationary seals 250, the dynamic seal 252 and/or the bearing 266 are repaired or replaced, the valve shaft apparatus 200 may be coupled to the valve body 204.

Figure 3:
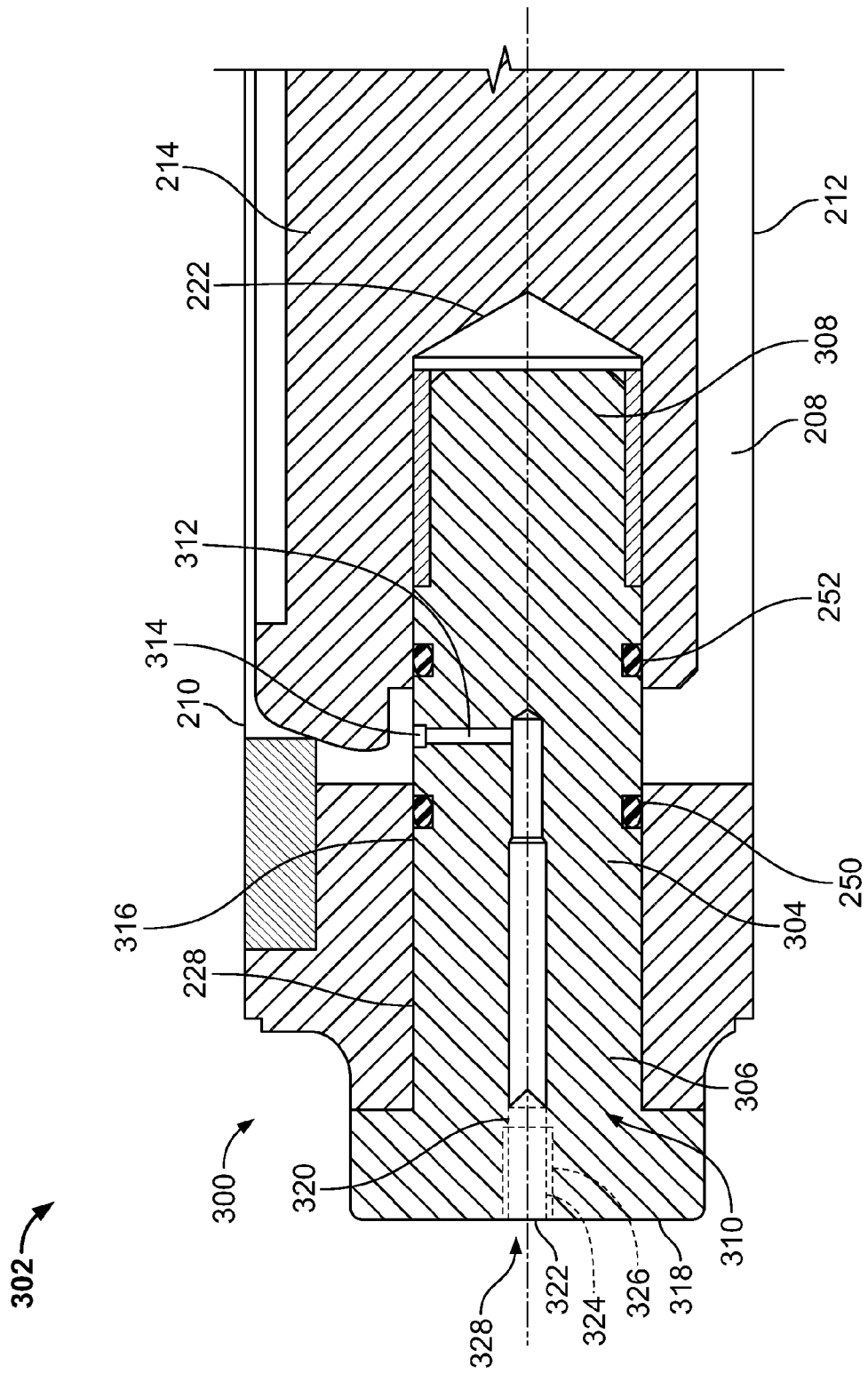
FIG. 3 illustrates another example valve shaft apparatus described herein.

FIG. 3 illustrates yet another example valve shaft apparatus 300 described herein that may be used to implement a fluid valve 302 (e.g., the fluid valve 202 of FIGS. 2A and 2B). Those components of the valve shaft apparatus 300 and the fluid valve 302 that are substantially similar or identical to the components of the valve shaft apparatus 200 and the fluid valve 202 described above and that have functions substantially similar or identical to the functions of those components will not be described in detail again below. Instead, the interested reader is referred to the above corresponding descriptions.

As shown, the valve shaft apparatus 300 includes a shaft or body 304 having the first seal or stationary seal 250 (e.g., an O-ring) disposed along a first portion 306 of the shaft 304 and the second seal or dynamic seal 252 (e.g., an O-ring) disposed along a second portion 308 of the shaft 304 spaced from the stationary seal 250. The stationary seal 250 is disposed in the opening 228 of the valve body 204 and the dynamic seal 252 is disposed in the cavity 222 of the closure member 214. The stationary seal 250 prevents fluid leakage into the opening 228 of the valve body 204 and the dynamic seal 252 prevents fluid leakage into the cavity 222 of the closure member 214.

The shaft 304 includes a weep hole or passageway 310 integrally formed with the shaft 304. The passageway 310 includes a channel 312 in fluid communication (e.g., in direct fluid communication) with the fluid flow path 208 of the fluid valve 302. The channel 312 fluidly couples the process fluid flowing between the inlet 210 and the outlet 212 of the fluid valve 300 to the passageway 310. As shown, the channel 312 is disposed between the stationary seal 250 and the dynamic seal 252. An opening 314 (e.g., a partial opening, an annular groove, etc.) may be disposed on an outer surface 316 of the shaft 302 in fluid communication with the channel 312 to direct, guide or funnel fluid flow toward the channel 312 and, thus, the passageway 310. The shaft 304 includes a flange 318 integrally formed with the shaft 304. The flange 318 removably couples the shaft 304 to the fluid valve 300 via, for example, fasteners (not shown). An opening 320 of the passageway 310 may be formed in the flange 318 and the opening 320 of the passageway 310 receives a pressure fitting 322 (e.g., a NPT fitting, a quick disconnect valve, etc.). The fitting 322 may have an externally threaded body 324 that threadably couples to threads 326 of the opening 320. Thus, the passageway 310 fluidly couples the opening 320 and/or the fitting 322 and the channel 312. The passageway 310 may have any suitable shape.

In operation, the passageway 310 provides a sampling port and/or injection port 328. In a sampling application, a sampling apparatus such as, for example, a reservoir, a container, piping etc. may be fluidly coupled to the passageway 310 via the pressure fitting 322. Process fluid flowing through the fluid valve 300 is received or flows toward the passageway 310. More specifically, the passageway 310 receives fluid flowing through the fluid flow path 208 via the channel 312. The pressure of the process fluid causes the fluid to flow toward the opening 320 of the passageway 310. The sampling apparatus, fluidly coupled to the passageway 310 via the pressure fitting 322, receives the process fluid via the passageway 310. When the sampling apparatus is removed from the pressure fitting 322 (e.g., disconnected from the fitting 322), the pressure fitting 322 prevents further fluid flow through the passageway 310. For example, a shut-off valve may be coupled to the pressure fitting 322 to control the fluid flow out of the passageway 310.

Alternatively, an injection apparatus such as, for example, a pump or piping may be coupled to the pressure fitting 322. A fluid (e.g., a liquid, a gas, a chemical, etc.) may be injected into the process fluid or the fluid flow path 208 of the fluid valve 300 via the passageway 310. When complete, the injection apparatus may be removed from the pressure fitting 322, which prevents further fluid flow through the passageway 310. For example, a shut-off valve may be coupled to the pressure fitting 322 to control the fluid flow into of the passageway 310.

Additionally, although not shown, a valve shaft apparatus may include both the seal leakage detector 272 and the sampling port/injection port 328. In other words, a valve shaft apparatus may be implemented with both the passageway 274 and the passageway 310 separate from the passageway 274. For example, a first passageway (e.g., the passageway 274) may be integrally formed with a shaft corresponding to the seal leakage detector 272 and a second passageway (e.g., the passageway 310) may be integrally formed with the shaft corresponding to the sampling passageway/injection passageway 328 such that the first passageway is not in fluid communication with the second passageway. Further, the first passageway may have a first opening (e.g., the opening 276) fluidly coupled to the atmosphere and the second passageway may have a second opening (e.g., the opening 320) to receive a pressure fitting (e.g., the pressure fitting 322).

In yet another example, a shaft may include a first passageway for detection of fluid leakage in a first leakage detection area (e.g., the first leakage detection area 258 of FIGS. 2A and 2B), a second passageway (not fluidly coupled to the first passageway) for detection of fluid leakage in a second leakage detection area (e.g., the second leakage detection area 260 of FIGS. 2A and 2B), and a third passageway (not fluidly coupled to either the first or second fluid passageways) for a sampling/injection port (e.g., the sampling port/injection port 328). In such an example, a flange of a shaft may be implemented with three openings, a first opening to fluidly couple the first passageway to the atmosphere, a second opening to fluidly couple the second passageway to the atmosphere, and a third opening fluidly coupled to the third passageway and configured to receive a pressure fitting.

Figure 4:
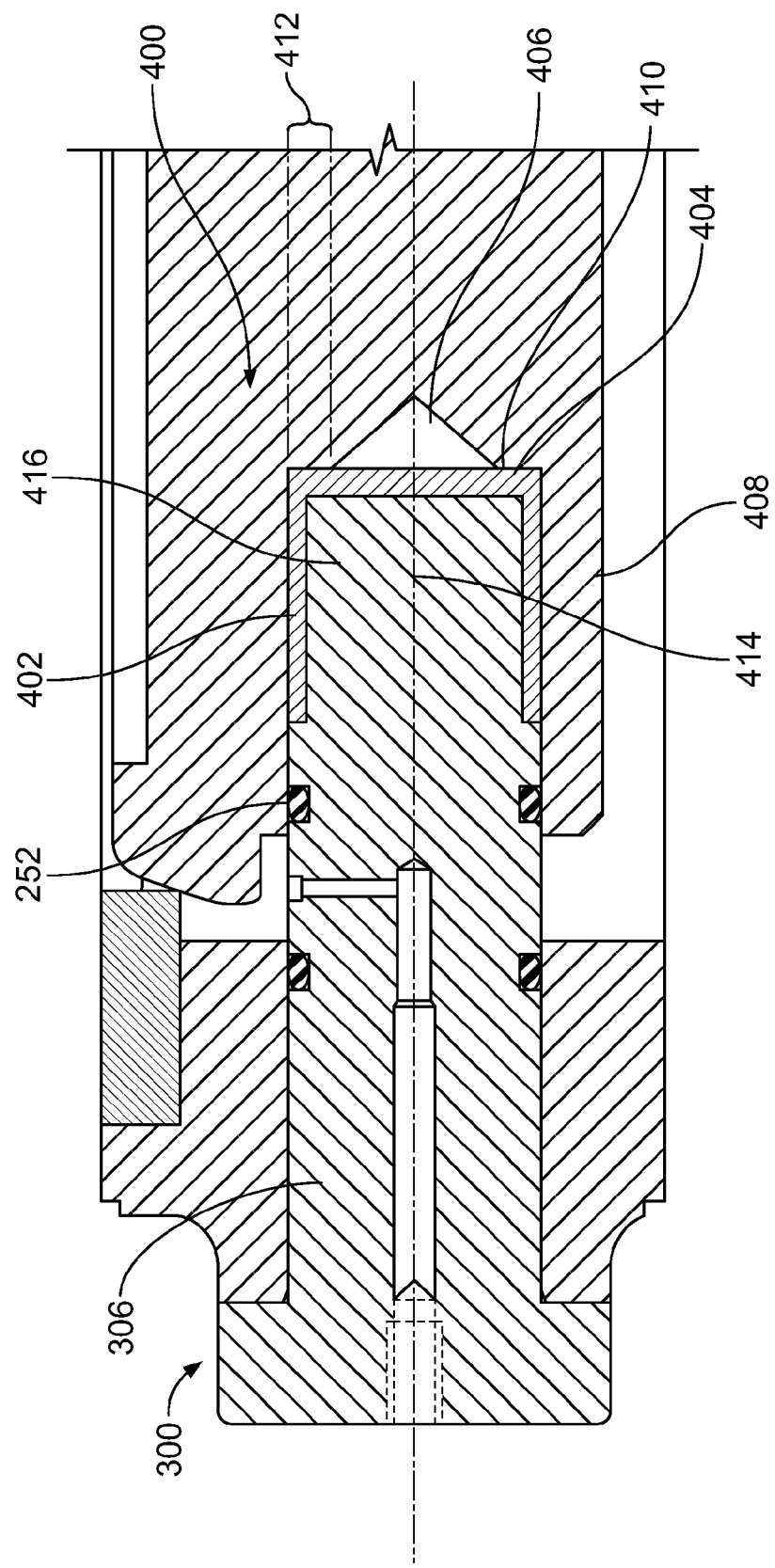
FIG. 4 illustrates an example bearing that may be used to implement the example valve shaft apparatus described herein.

FIG. 4 illustrates an example bearing 400 that may be used to implement the example valve shaft apparatus 200 of FIGS. 2A and 2B and the example valve shaft apparatus 300 of FIG. 3. As shown, the bearing 400 is implemented with the example valve shaft apparatus 300 of FIG. 3. In the illustrated example, the bearing includes a combination radial bearing 402 and a thrust bearing 404. A cavity 406 of a closure member 408 may be formed with a substantially flat surface or hole 410 to provide a bearing landing 412. The thrust bearing 404 engages the bearing landing 412 or the flat surface 410 formed in a cavity 406 of the closure member 408 to provide thrust support in the axial direction along an axis 414 when a thrust force is imparted to the valve shaft apparatus 300 by, for example, an actuator. The radial bearing 402 provides radial alignment about the axis 414 and/or facilitates rotation of the closure member 408 about the shaft 306. Thus, the thrust bearing 404 supports a load imparted to the shaft 306 in a direction along the axis 414 and the radial bearing 402 supports a load imparted to the shaft 306 in a radial direction about the axis 414. In yet another example, a portion 416 of the shaft 306 adjacent the dynamic seal 252 may include a tapered end or surface that matably engages a tapered surface of the cavity 406. The bearing 400 may also include a tapered opening to matably engage or receive the end 416 of the shaft 306.

Although certain methods, apparatus and articles of manufacturing have been described herein, the scope of coverage of this patent is not limited thereto. To the contrary, this patent covers all methods, apparatus and articles of manufacturing fairly falling within the scope of the appended claims either literally or under the doctrine of equivalents.

What is claimed:

1. A valve shaft apparatus for use with a rotary valve comprising:
   a shaft having a first portion to be positioned in an opening of a valve body and a second portion to be in a cavity of a closure member;
   a first seal coupled to the first portion of the shaft to prevent fluid leakage into the opening of the valve body, the first seal to define a first leakage detection area adjacent the first seal;
   a second seal coupled to the second portion to prevent fluid leakage into the cavity of the closure member, the first seal spaced from the second seal, the second seal to define a second leakage detection area adjacent the second seal; and
   a passageway formed in the shaft and fluidly coupled to the first and second leakage detection areas to provide an indication of fluid leakage past the first seal in the opening or to detect fluid leakage past the second seal in the cavity, the passageway being in fluid communication with a shaft outlet formed in an end of the shaft, the shaft outlet positioned away from the first and second leakage detection areas.

2. The apparatus of claim 1, wherein the passageway comprises a first passageway in fluid communication with the first leakage detection area and the shaft outlet, and further comprises a second passageway in fluid communication with the second leakage detection area and the shaft outlet.

3. The apparatus of claim 2, wherein the first passageway is coaxially aligned with and in fluid communication with the second passageway.

4. The apparatus of claim 2, wherein the first passageway has a first cross-sectional shape and the second passageway has a second cross-sectional shape different from the first cross-sectional shape to cause fluid in the first and second passageways to flow toward the outlet of the shaft and prevent fluid in the first and second passageways from flowing toward the first and second leakage detection areas.

5. The apparatus of claim 2, wherein the first passageway is fluidly isolated from the second passageway.

6. The apparatus of claim 2, wherein the first passageway further comprises a first channel adjacent the first seal to fluidly couple the first leakage detection area and the first passageway, and the second passageway further comprises a second channel adjacent the second seal to fluidly couple the second leakage detection area and the second passageway.

7. The apparatus of claim 6, wherein the first and second channels are non-parallel relative to the passageway.

8. The apparatus of claim 6, further comprising a first groove formed on an outer surface of the first portion of the shaft adjacent the first seal, the first groove fluidly coupled to the first channel to guide fluid in the first leakage detection area to the first channel.

9. The apparatus of claim 8, further comprising a second groove formed on an outer surface of the second portion of the shaft adjacent the second seal, the second groove fluidly coupled to the second channel to guide fluid in the second leakage detection area to the second channel.

10. The apparatus of claim 1, wherein the shaft has a flanged portion to facilitate mounting the shaft to the valve body.

11. The apparatus of claim 1, further comprising a pathway integrally formed with the shaft and fluidly isolated from the passageway, the pathway to provide an injection port to enable a fluid to be injected in a flow path of the valve body or a sampling port to enable sampling a process fluid flowing in the flow path the valve body.

12. The apparatus of claim 11, wherein the pathway comprises a channel to fluidly couple the pathway and a process fluid flowing between an inlet and an outlet of the valve body.

13. The apparatus of claim 1, wherein the channel is positioned between the first seal and the second seal.

14. The apparatus of claim 1, wherein an end of the pathway defines a port to receive a fitting accessible from an outer surface of the valve body.

15. A valve shaft apparatus for use with a rotary valve comprising:
   a shaft having a first portion to be positioned in an opening of a valve body, a second portion to be positioned in a cavity of a closure member, and a third portion between the first and second portions, the third portion at least partially positioned within a fluid flow path of the valve body;
   a first seal coupled to the first portion of the shaft to prevent fluid leakage into the opening of the valve body;
   a second seal coupled to the second portion to prevent fluid leakage into the cavity of the closure member; and
   a first passageway formed in the shaft and fluidly coupled to a first port formed in an end of the shaft, the first passageway to fluidly couple the first port and the fluid flow path of the valve body via the third portion of the shaft, the first passageway to provide a sampling port to sample process fluid flowing through the flow path or an injection port to enable injection of a fluid in the fluid flow path.

16. The apparatus of claim 15, wherein the first seal defines a first leakage detection area adjacent the first seal and the second seal defines a second leakage detection area adjacent the second seal.

17. The apparatus of claim 16, further comprising a second passageway formed in the shaft to fluidly couple the first leakage detection area to a second port formed in the end of the shaft, the second passageway to provide an indication of fluid leakage past the first seal in the opening of the valve body.

18. The apparatus of claim 17, further comprising a third passageway formed in the shaft to fluidly couple a second leakage detection area to a third port formed in the end of the shaft, the third passageway to provide an indication of fluid leakage past the second seal in the cavity.

19. The apparatus of claim 18, wherein the first passageway is fluidly isolated form the second and third passageways.

20. A valve shaft apparatus for use with a rotary valve comprising:
   means for supporting a closure member of a fluid valve, the means for supporting the closure member removably coupled to a body of the fluid valve via an opening extending to an outer surface of the body;
   first means for providing a seal between a fluid flow path of the fluid valve and the opening of the body through;
   first means for fluidly coupling a first area adjacent the first means for providing a seal and an aperture formed in the means for supporting the closure member, the aperture adjacent the outer surface of the body, the first means for fluidly coupling to provide an indication of fluid leakage past the first means for sealing;
   second means for providing a seal between the fluid flow path of the fluid valve and a cavity of the closure member, the first means for providing the seal and the second means for providing the seal being disposed on the means for supporting the closure member; and
   second means for fluidly coupling a second area adjacent the second means for providing the seal and the cavity to the aperture of the first means for supporting the closure member, the second means for fluidly coupling to provide an indication of fluid leakage past the second means for providing the seal.

21. The apparatus of claim 20, wherein the first and second means for fluidly coupling are integrally formed with the means for supporting the closure member.

* * * * *